US012579497B2

(12) United States Patent
Aristides

(10) Patent No.: US 12,579,497 B2
(45) Date of Patent: Mar. 17, 2026

---

(54) RADIO FREQUENCY IDENTIFICATION SHIPPING LABELS

(71) Applicant: eBay Inc., San Jose, CA (US)

(72) Inventor: Phivos Costas Aristides, Seattle, WA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 18/386,581

(22) Filed: Nov. 2, 2023

(65) Prior Publication Data

US 2025/0148402 A1     May 8, 2025

(51) Int. Cl.
*G06Q 10/083*         (2024.01)
*G06K 19/07*          (2006.01)

(52) U.S. Cl.
CPC ....... *G06Q 10/083* (2013.01); *G06K 19/0723* (2013.01)

(58) Field of Classification Search
CPC .......................... G06Q 10/083; G06K 19/0723
See application file for complete search history.

(56) References Cited

U.S. PATENT DOCUMENTS

| | | | |
|---|---|---|---|
| 6,265,977 B1 * | 7/2001 | Vega ................ | G06K 19/07786 |
| | | | 29/601 |
| 9,699,606 B1 | 7/2017 | Bhatia et al. | |
| 9,836,715 B2 | 12/2017 | Gillen et al. | |
| 10,255,737 B1 | 4/2019 | Eichenblatt | |
| 11,115,629 B1 | 9/2021 | Lemberger et al. | |

| | | | |
|---|---|---|---|
| 11,188,868 B2 | 11/2021 | Anders et al. | |
| 2003/0144871 A1 * | 7/2003 | Turbeville ............. | G06Q 10/08 |
| | | | 705/404 |
| 2004/0233065 A1 * | 11/2004 | Freeman ................ | G06K 17/00 |
| | | | 340/8.1 |

(Continued)

FOREIGN PATENT DOCUMENTS

CN          111951083          11/2020

OTHER PUBLICATIONS

BlueBite, "How to Write NFC on Android: Step-by-step instructions on how to use your Android phone to write NFC tags", Nov. 17, 2022 (available at: https://www.bluebite.com/nfc/how-to-write-nfc-on-android). (Year: 2022).*

(Continued)

*Primary Examiner* — Shannon S Campbell
*Assistant Examiner* — Stephanie S. Wallick
(74) *Attorney, Agent, or Firm* — SCHWEGMAN LUNDBERG & WOESSNER, P.A.

(57)          ABSTRACT

Systems and methods are directed to generating radio frequency identification (RFID) shipping labels. A request to access shipping options is received, via a mobile application operating on a mobile device of a user, whereby the shipping options include an option to program a RFID tag associated with a package to be shipped. In response to receiving the request, the shipping options are presented on a user interface displayed on the mobile device. An indication of a selection of the option to program the RFID tag is received via the mobile application. In response to receiving the indication, instructions are presented on a second user interface that indicate positioning the mobile device within proximity of the RFID tag. The mobile device then programs the RFID tag with shipping information.

16 Claims, 6 Drawing Sheets

(56) References Cited

U.S. PATENT DOCUMENTS

| | | | |
|---|---|---|---|
| 2005/0088285 A1* | 4/2005 | Jei | G06K 7/0008 370/467 |
| 2005/0230478 A1* | 10/2005 | Chapman | G06K 17/0025 235/462.13 |
| 2006/0071063 A1* | 4/2006 | Duckett | G06K 1/128 400/23 |
| 2006/0220859 A1* | 10/2006 | Nagai | B41J 3/50 340/572.1 |
| 2006/0282271 A1* | 12/2006 | Ananda | G06Q 10/08 705/26.1 |
| 2007/0005452 A1 | 1/2007 | Klingenberg et al. | |
| 2007/0069030 A1* | 3/2007 | Sauerwein, Jr. | G06K 7/0004 235/462.46 |
| 2013/0069762 A1* | 3/2013 | Geiszler | H04Q 9/00 340/5.65 |
| 2014/0074746 A1* | 3/2014 | Wang | G06Q 10/083 705/341 |
| 2014/0279648 A1* | 9/2014 | Whitehouse | G06Q 10/083 705/330 |
| 2014/0355057 A1* | 12/2014 | Jang | G06K 7/10297 358/1.15 |
| 2015/0156030 A1 | 6/2015 | Fadell et al. | |
| 2015/0371183 A1 | 12/2015 | Anderson | |
| 2018/0053365 A1 | 2/2018 | Bode et al. | |
| 2018/0075400 A1 | 3/2018 | Scalisi et al. | |
| 2018/0089610 A1* | 3/2018 | Greco | H04B 5/72 |
| 2018/0218319 A1* | 8/2018 | Cantrell | G06Q 10/0833 |
| 2018/0247509 A1 | 8/2018 | Ashkenazi et al. | |
| 2018/0341914 A1* | 11/2018 | Levy | G06K 7/10297 |
| 2019/0043010 A1* | 2/2019 | Smith | G06Q 10/0833 |
| 2019/0213817 A1 | 7/2019 | Wechsler et al. | |
| 2019/0244448 A1 | 8/2019 | Alamin et al. | |
| 2019/0254460 A1 | 8/2019 | Geng | |
| 2019/0377915 A1* | 12/2019 | Atkinson | G06K 19/0723 |
| 2020/0219348 A1 | 7/2020 | Hanlon | |
| 2020/0311670 A1* | 10/2020 | Sankaran | H04W 12/63 |
| 2020/0312073 A1 | 10/2020 | Ivarson | |
| 2021/0282581 A1 | 9/2021 | Odeh | |
| 2021/0350320 A1 | 11/2021 | Munafo et al. | |
| 2022/0129841 A1* | 4/2022 | Gutke | G08B 13/19602 |
| 2023/0132696 A1 | 5/2023 | Banjo | |
| 2023/0237426 A1 | 7/2023 | Ton et al. | |
| 2024/0104487 A1* | 3/2024 | Carroll | G06Q 10/083 |
| 2025/0148403 A1 | 5/2025 | Aristides | |

OTHER PUBLICATIONS

Seritag, "How To Read NFC Tags With An iPhone", Sep. 15, 2020 (updated Jun. 27, 2023), (available at: https://seritag.com/learn/using-nfc/how-to-read-nfc-tags-with-an-iphone) (Year: 2023).*

NXP, "NFC TagWriter by NXP: Advanced Features", User Manual, Rev 1.29, Nov. 16, 2018 (available at: https://inspire.nxp.com/tagwriter/tag-writer-user-manual.pdf) (Year: 2018).*

Zebra, "Print a UPS Shipping Label from a Mobile Device", Jan. 20, 2022 (available at: https://zsbsupport.zebra.com/s/article/000021367). (Year: 2022).*

Weebly Support, "Print Shipping Labels Using the Android App" available at: https://www.weebly.com/app/help/us/en/topics/print-shipping-labels-using-the-android-app (Feb. 22, 2023) (Year: 2023).*

"U.S. Appl. No. 18/401,011, Non Final Office Action mailed Nov. 12, 2024", 27 pgs.

"USPS.com Informed Delivery Dashboard, Article No. 000005317", [Online]. Retrieved from the Internet: https:faq.usps.eom s article Informed-Delivery-Dashboard, (Feb. 28, 2021), 6 pages.

"U.S. Appl. No. 18/401,011, Examiner Interview Summary mailed Feb. 11, 2025", 3 pgs.

"U.S. Appl. No. 18/401,011, Final Office Action mailed Apr. 14, 2025", 22 pgs.

"RFID Tracking Labels are the Future of Packaging", [Online]. Retrieved from the Internet: https: spotsee.io uncategorized rfid-tracking-stickers-are-the-future-of-packaging , (Jun. 2020), 13 pgs.

"U.S. Appl. No. 18/401,011, Examiner Interview Summary mailed Jul. 15, 2025", 2 pgs.

Misani, Manuela, "Introducing QR Codes for eBay Shipping Labels", [Online]. Retrieved from the Internet: https: innovation.ebayinc.com stories introducing-qr-codes-for-ebay-shipping-labelsnew-blog-post , (Nov. 2020), 5 pgs.

Scragg, Kelly, "eBay and FedEx Extend Alliance In Canada With Shipping Labels Platform Integration", [Online]. Retrieved from the Internet: https: www.ebayinc.com stories press-room ca ebay-and-fedex-extend-alliance-in-canada-with-shipping-labels-platform-integration , (May 2022), 3 pgs.

"U.S. Appl. No. 18/401,011, Non Final Office Action mailed Oct. 24, 2025", 23 pgs.

* cited by examiner

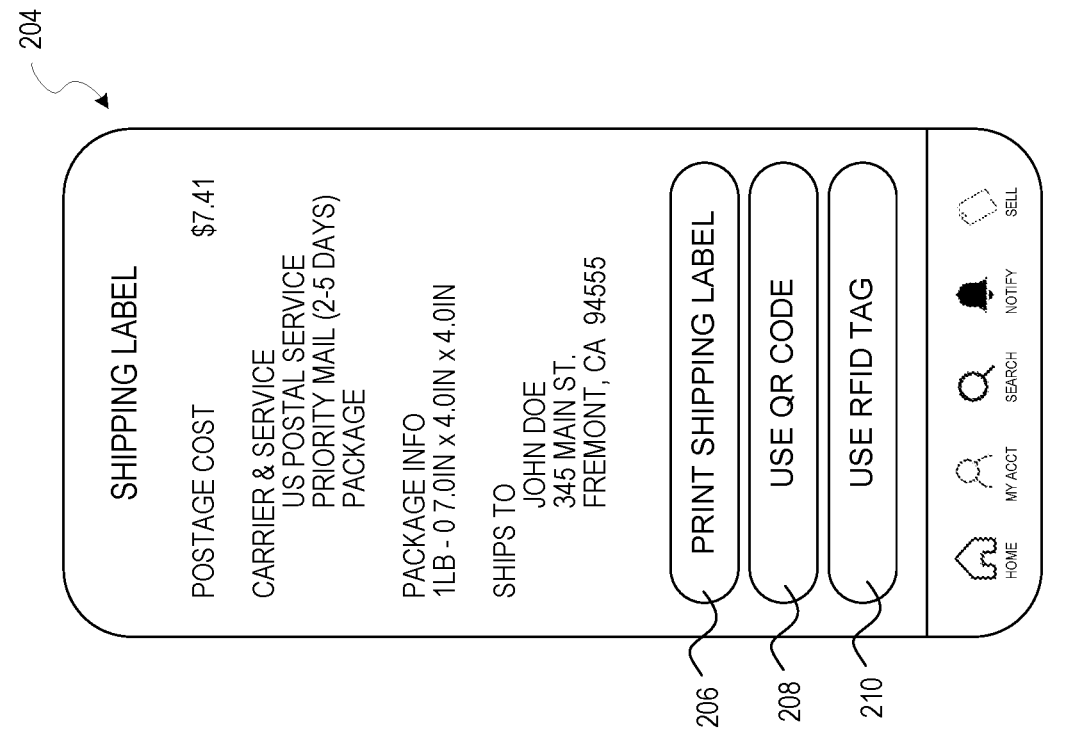

202 — IT'S TIME TO SHIP THE ITEM

BUYER        USER123
SALE DATE    OCT 15, 2023 11:30 AM
BUYER PAID   OCT 15, 2023 11:32 AM

SENT         NOT SHIPPED

SHIPPING     USPS PRIORITY MAIL
SERVICE

BUYER'S      345 MAIN ST.
ADDRESS      FREMONT, CA 94555

CREATE SHIPPING LABEL

LEAVE FEEDBACK

MARKED AS SHIPPED

CONTACT BUYER

HOME   MY ACCT   SEARCH   NOTIFY   SELL

SHIPPING LABEL

POSTAGE COST      $7.41

CARRIER & SERVICE
    US POSTAL SERVICE
    PRIORITY MAIL (2-5 DAYS)
    PACKAGE

PACKAGE INFO
1LB - 0 7.0IN x 4.0IN x 4.0IN

SHIPS TO
    JOHN DOE
    345 MAIN ST.
    FREMONT, CA 94555

206 — PRINT SHIPPING LABEL

208 — USE QR CODE

210 — USE RFID TAG

HOME   MY ACCT   SEARCH   NOTIFY   SELL

214

USE RFID TAG

WRITE TO RFID TAG SUCCESSFUL

FINISHED

216

HOME   MY ACCT   SEARCH   NOTIFY   SELL

212

USE RFID TAG

POSITION YOUR MOBILE DEVICE
NEAR THE RFID TAG

CANCEL

HOME   MY ACCT   SEARCH   NOTIFY   SELL

218

RADIO FREQUENCY IDENTIFICATION SHIPPING LABELS

TECHNICAL FIELD

The subject matter disclosed herein generally relates to generating shipping labels. Specifically, the present disclosure addresses systems and methods for generating and using radio frequency identification (RFID) tags as shipping labels.

BACKGROUND

Conventionally, online marketplaces provide options to sellers and buyers to print pre-paid shipping labels to ship (and to return) items transacted via the online marketplaces. However, this requires the sellers and buyers to have access to a printer. Alternatively, the sellers and buyers can be provided a QR code. The QR code can then be presented to a shipping entity, which will print the shipping label for the seller or buyer. In these cases, the sellers and/or buyers need to have the QR code available at a location of the shipping entity and ensure they do not get multiple packages/QR codes mixed up.

BRIEF DESCRIPTION OF THE DRAWINGS

FIG. 2A-FIG. 2E are example user interfaces displayed on a mobile device for generating and verifying RFID shipping labels, according to example embodiments.

DETAILED DESCRIPTION

Figure 1:
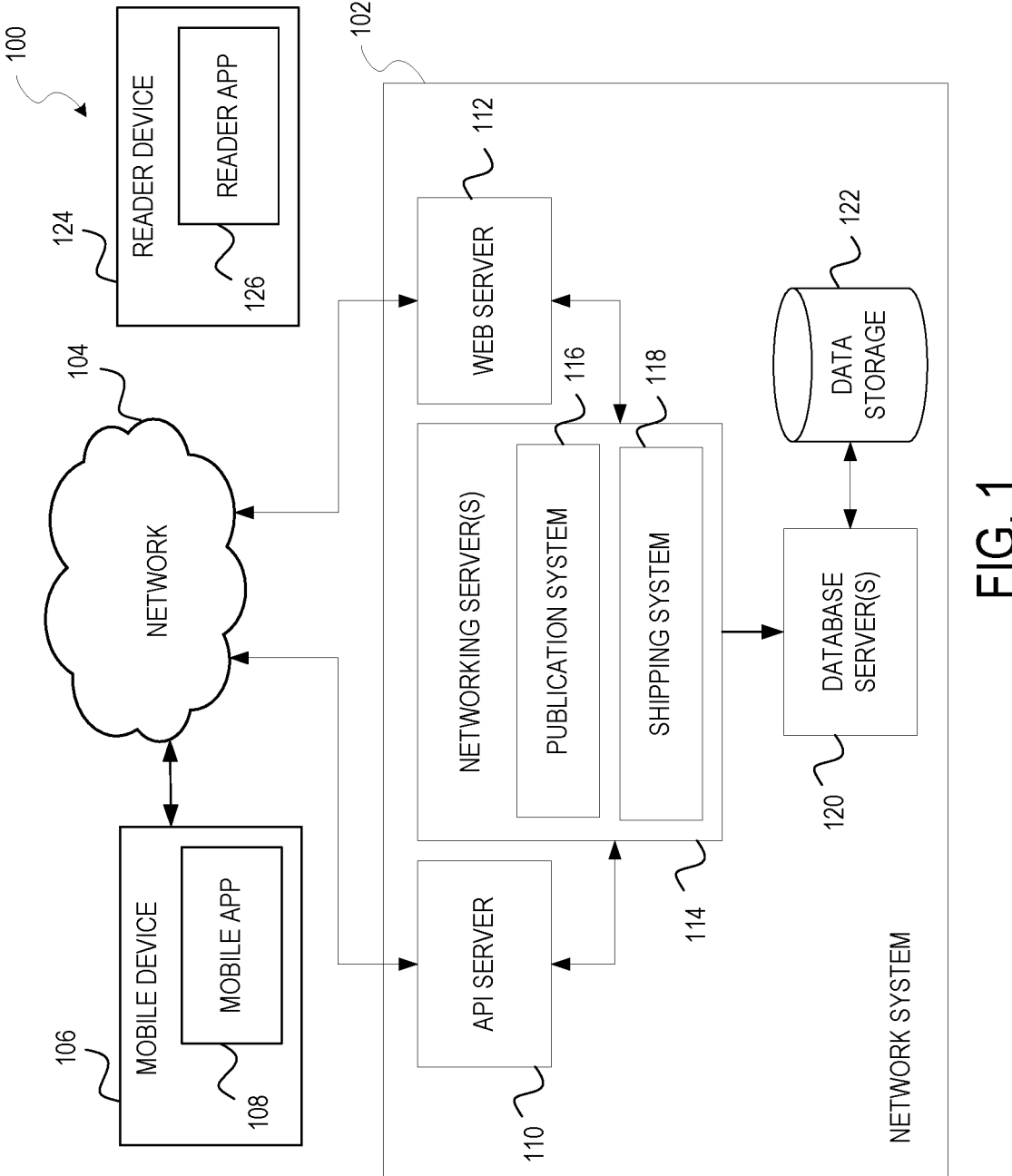
FIG. 1 is a diagram illustrating an example network environment suitable for generating radio frequency identification (RFID) shipping labels, according to example embodiments.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

Systems and methods for generating and using radio frequency identification (RFID) shipping labels are discussed herein. Example embodiments use components and functionalities of a mobile device along with a mobile application to program a RFID tag with shipping information. The RFID tag comprises a RFID sticker that can be applied directly to a package to be shipped. The shipping information can include sender details, package content details, such as for customs or regulatory reasons, number of items included, weights and dimensions, purchase order details, a shipping address or addresses of a recipient(s), a return address or addresses (e.g., weekday or weekend return addresses), carrier tracking numbers, tracking info such as tracking stage, creation and update timestamps, phone number(s), and/or shipment payment information (e.g., postage paid). In some cases, the RFID tag can be used as a postage stamp for the package.

Each RFID tag comprises a unique identifier and is able to permanently store information. Specifically, an antenna of a scanner or mobile device emits a small charge that transmits or receives information from the RFID tag. Typically, the scanner or mobile device used to program or read from the RFID tag needs to be at proximity to the RFID tag (e.g., within a few inches or centimeters).

In some cases, the shipping information on the RFID tag can be encoded and/or partially or wholly encrypted to be readable by a particular shipping entity. For example, the shipping information may only be readable (e.g., decrypted) by FedEx or UPS. In other cases, a plurality of different sets of shipping information is encoded on the RFID tag whereby each set is readable (e.g., decryptable) by a different shipping entity. For instance, FedEx can read a first set of shipping information and UPS can read a second set of shipping information.

In some cases, the sender/shipper may require a recipient sign for the package or be present to accept the package. In these cases, the shipping information on the RFID may include an indication that a signature is required. A scanner of a delivery person of the shipping entity will display this indication and may display a field for a signature. Along these lines, a recipient can delegate another individual (e.g., apartment or building receptionist or manager) to sign or receive the package on their behalf. For example, a user interface (e.g., provided via a client application or link) on a device of the recipient may provide a selectable option to designate another individual and a field to indicate the individual.

Thus, example embodiments address the problem of having access to a printer or access to a QR code at a shipping entity location in order to generate a shipping label. Additionally, because the shipping information is encoded and/or encrypted on the RFID tags, example embodiments also provide the additional benefit of providing privacy/security since shipping information is not visible on the package.

FIG. 1 is a diagram illustrating an example network environment 100 suitable for generating radio frequency identification (RFID) shipping labels, according to example embodiments. A network system 102 provides server-side functionality via a communication network 104 (e.g., the Internet, wireless network, cellular network, or a Wide Area Network (WAN)) to a mobile device 106. The network environment 100 is configured to encode an RFID tag with shipping information and to read/verify the encoded RFID tag, as will be discussed in more detail below.

In various cases, the mobile device 106 is a device associated with a user account of a user of the network system 102 that wants to generate an RFID shipping label. For example, the user may be a seller that wants to ship a package to a buyer. In other cases, the mobile device 106 is a device associated with a user account of a buyer of the network system 102 that wants to return an item to a seller. Further still, the mobile device 106 may be a device of an individual that simply wants to ship a package (e.g., not involving a sales transaction).

The mobile device 106 comprises one or more mobile applications 108 that communicate with the network system 102 for added functionality. In one embodiment, the mobile application 108 comprises a communication component that exchanges data with the network system 102. For example, the mobile application 108 may be a local version of an application or component of the network system 102. Alternatively, the mobile application 108 exchanges data with one or more corresponding components/applications at the network system 102. The mobile application 108 may be provided by the network system 102 and/or downloaded to the mobile device 106. A request to generate an RFID shipping label can be sent via the mobile application 108 to the network system 102. In return, the mobile application 108 receives shipping information that can be encoded onto the RFID tag. The mobile application 108 then triggers a Near Field Communication (NFC) tag writer component of the mobile device 106 to transmit the shipping information to the RFID tag. In some cases, the mobile device 106 can work offline. In these cases, the mobile application 108 of the mobile device 106 comprises some of the functionalities of the network system 102 including determining the shipping information.

In some cases, the mobile device 106 interfaces with the network system 102 via a connection with the network 104. Depending on the form of the mobile device 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (e.g., Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The mobile device 106 may comprise, but is not limited to, a smartphone, tablet, laptop, multi-processor systems, microprocessor-based or programmable consumer electronics, game consoles, or any other communication device that can access the network system 102 and has near field communication (NFC) capabilities for emitting radio frequency signals used in encoding RFID tags. Additionally, the mobile device 106 comprises a display component (not shown) to display information (e.g., in the form of user interfaces) as will be discussed in more detail below. The mobile device 106 can be operated by a human user and/or a machine user.

Turning specifically to the network system 102, an application programing interface (API) server 110 and a web server 112 are coupled to and provide programmatic and web interfaces respectively to one or more networking servers 114. The networking server(s) 114 host various systems including a publication system 116 and a shipping system 118, each of which comprises a plurality of components and each of which can be embodied as hardware, software, firmware, or any combination thereof.

The networking server(s) 114 are, in turn, coupled to one or more database servers 120 that facilitate access to one or more storage repositories or data storage 122. The data storage 122 is a storage device storing, for example, user accounts including user profiles of users of the network system 102.

The publication system 116 is configured to manage listings (e.g., publications of available goods or services) and transactions at the network system 102 including generating and publishing listings, conducting searches for listings, and maintaining user accounts. The publication system 116 may comprise an account component that maintains and updates data associated with each user account by storing data to the data storage 122. In example embodiments, the user accounts include shipping information for all users of the network system 102. The user accounts can also include payment information (e.g., credit card number, PayPal account information) that can be used to pay for items and/or shipping costs.

The shipping system 118 is configured to manage shipping of items. In some cases, the items to be shipped are items transacted via the publication system 116. In other cases, the items to be shipped are simply packages that are to be shipped (e.g., not purchased via the publication system 116). In these cases, the network system 102 may not include the publication system 116.

In example embodiments, the shipping system 118 accesses and generates various information that comprises the shipping information. For instance, the shipping system 118 can access the data storage 122 via the database server 120 to retrieve a shipping address of a shipper and/or a shipping address of a recipient. Based on the addresses and, in some cases, dimensions and/or weight of the package to be shipped, the shipping system 118 calculates postage (or shipping costs) for shipping the package. The shipping system 118 can then access the data storage 122 to access payment information to pay for postage or shipping costs associated with shipping a package.

In some embodiments, the dimensions of the package are detected by the mobile device 106. For instance, the mobile application 108 can trigger a lidar sensor on the mobile device 106 to scan the package and estimate the dimensions. The dimensions can then be transmitted, via the mobile application 108, to the shipping system 118. In other cases, the dimensions and weights can be entered by the shipper (e.g., via the mobile application 108).

The shipping system 118 exchanges information including the shipping information with the mobile device 106 via the mobile application 108. Accordingly, the shipping system 118 can generate and provide (or cause the mobile application 108 to generate and present) user interfaces that allow the user of the mobile device 106 to generate the RFID shipping label. Examples of the user interfaces are discussed in more detail below.

The environment 100 also comprises a reader device 124. The reader device 124 is a RFID reader device associated with a shipping entity (e.g., U.S. Postal Service, FedEx, UPS, DHL). The reader device 124 includes a reader application 126 that is configured to obtain information from RFID tags. Using the reader device 124, the shipping entity can scan the RFID tag or shipping label to obtain the shipping address of the recipient as well as other information such as a return address. In some cases, the reader device 124 is a handheld device that is used to scan the RFID tag, for example, at a shipping entity location or on a delivery truck.

In other cases, the reader device 124 can be a stationary device positioned relative to a conveyer belt that can scan packages as they move past the reader device 124. This can be used to scan packages as it moves through various parts of a shipping center or as packages are loaded/unloaded between shipping centers and vehicles of the shipping entity. Advantageously, because the reader device 124 uses NFC, the RFID tag does not need to be in direct line of sight of a scanning device (as opposed to scanning QR codes or bar codes).

In example embodiments, the reader device 124 is not communicatively coupled to the network 104. That is, the reader device 124, can work while offline. However, alternative embodiments may communicatively couple the reader device 124 via the network 104 to the network system 102 and/or the mobile device 106 to enable the reading device 124 to communicate with the mobile device 106 and/or the network system 102.

Any of the systems, data storage, or devices (collectively referred to as "components") shown in, or associated with, FIG. 1 may be, include, or otherwise be implemented in a special-purpose (e.g., specialized or otherwise non-generic) computer that can be modified (e.g., configured or programmed by software, such as one or more software components of an application, operating system, firmware, middleware, or other program) to perform one or more of the functions described herein for that system or machine. For example, a special-purpose computer system able to implement any one or more of the methodologies described herein is discussed below with respect to FIG. 4, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one system may, in alternative examples, be embodied in a different system. For example, any of the functionalities discusses above with respect to the shipping system 118 may be embodied within the mobile application 108. Additionally, any number of mobile devices 106, data storage 122, and reader devices 124 may be embodied within the network environment 100. While only a single network system 102 is shown, alternatively, more than one network system 102 can be included (e.g., localized to a particular region).

Figure 2D:
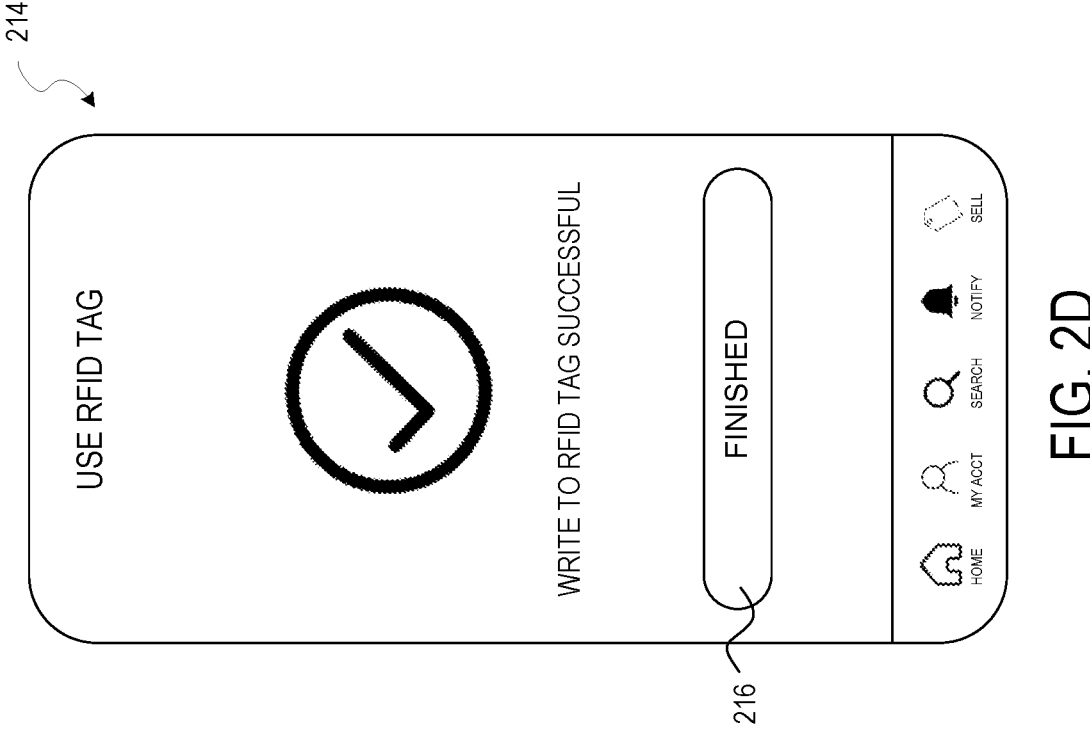

FIG. 2A-FIG. 2E are example user interfaces for generating and verifying RFID shipping labels that are displayed on the mobile device 106, according to example embodiments. Referring to FIG. 2A, a Shipping Reminder user interface (UI) 200 that is presented on a display of the mobile device 106 in a sales transaction embodiment is shown. Here, an item to be shipped was purchased via the network system 102. The buyer is reminded via the Shipping Reminder UI 200 to ship the item. The Shipping Reminder UI 200 may display a sales transaction date, a status of the shipping (e.g., not shipped), a shipping entity or service that will be used, and the buyer's address. Alternative embodiments may display other information or remove some of the displayed information in FIG. 2A. The Shipping Reminder UI 200 also includes a plurality of selectable options including a Create Shipping Label option 202.

Upon selection of the Create Shipping Label option 202, the shipping system 118 and/or the mobile application 108 updates the display with (e.g., generates and causes presentation of) a Shipping Label UI 204 as shown in FIG. 2B. The example Shipping Label UI 204 presents a postage cost, a carrier (e.g., shipping entity) and corresponding service type (e.g., priority mail, 2-day express, ground shipping), package information including weight and dimensions, and a shipping address of the recipient. Alternative examples may present more, less, or other information. The weight and dimensions may be accessed from the data storage 122 in some cases. In other case, the mobile device 106 can use a lidar sensor to detect the dimensions. Further still, the weights and dimensions can be manually entered by a shipper.

In embodiments where a package is to be shipped that does not involve a sales transaction conducted by the network system 102, the Shipping Label UI 204 may be presented to a shipper after the shipper provides (e.g., manually enters) a shipping address and package information (e.g., weights and dimensions) via the mobile application 108 (e.g., on a shipping information UI). The postage can be calculated by the shipping system 118 or mobile application 108 and presented on the Shipping Label UI 204.

The Shipping Label UI 204 also includes label options including a Print Shipping Label option 206, a Use QR Code option 208, and a Use RFID Tag option 210. Selection of the Print Shipping Label option 206 causes generation and presentation of a UI that provides printing options (e.g., paper size, printer name, color options) and a trigger to send shipping label data to a printer. Selection of the Use QR Code option 208 causes the generation of a QR code with the shipping information and presentation of the generated QR code on the mobile device 106.

Figure 2C:
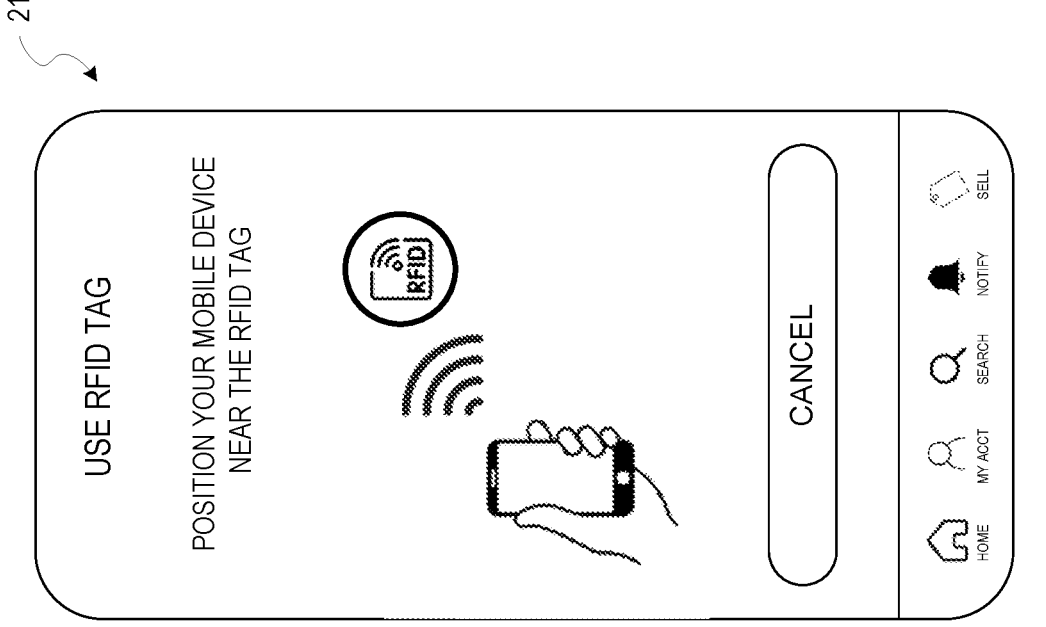

Selection of the Use RFID Tag option 210 triggers a process to generate the RFID shipping label. Specifically, a Use RFID Tag UI 212, as shown in FIG. 2C, is generated and presented on the mobile device 106. As shown, the Use RFID Tag UI 212 provides instructions, both textually and graphically, to the user of the mobile device 106 to position their mobile device near the RFID tag. Alternative embodiments may use text, graphics, or speech (e.g., dictated instructions) individually or in any combination. During this time, the mobile application 108 triggers an NFC tag writer component on the mobile device 106 which transmits the shipping information.

Once the RFID tag is encoded with the shipping information, the shipping system 118 or mobile application 108 updates the display to present (e.g., generates and causes presentation of) a Success UI 214 as shown in FIG. 2D. The Success UI 214 presents an indication that the shipping information has been successfully encoded on the RFID tag. Specifically, the NFC tag writer component can exchange information with the RFID tag such that when the RFID tag is encoded, the NFC tag writer component can detect a signal from the RFID tag indicating the shipping information. With the RFID tag encoded with the shipping information, the user can then select a Finished option 216 to complete the process. It is noted that the RFID tag can comprise of a RFID sticker that can be applied (e.g., stuck on) the package to be shipped before or after the encoding of the shipping information on the RFID tag or otherwise attached to the package (e.g., inserted in a self-adhesive envelope, inserted into the package).

Figure 2E:
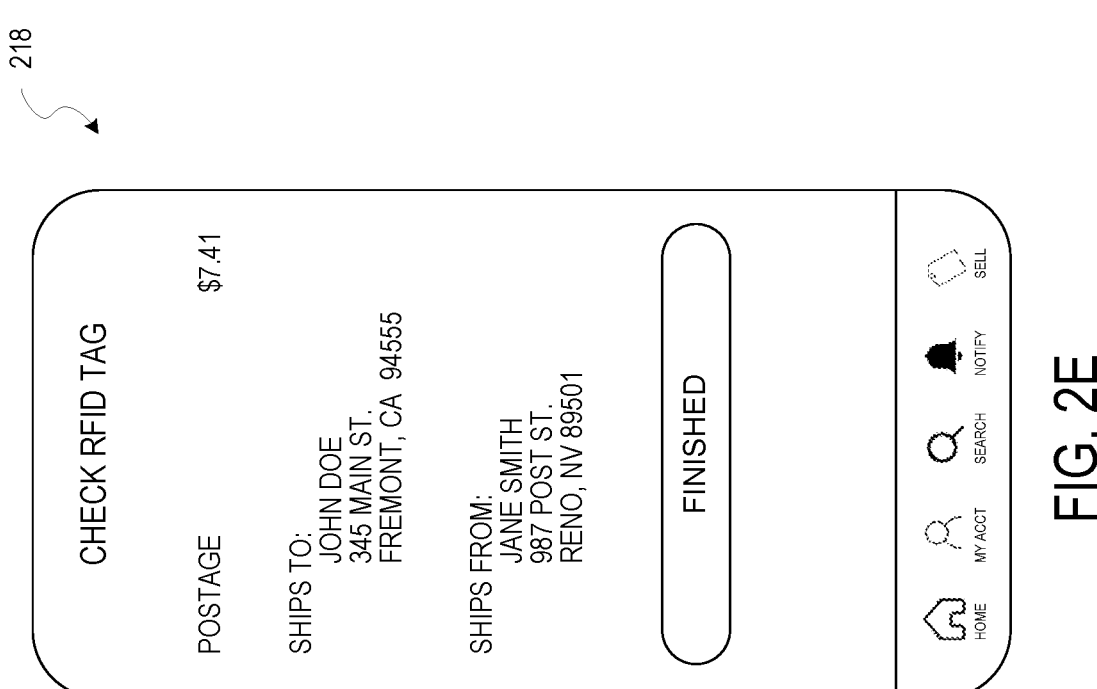

The mobile device 106 and/or the reader device 124 can then read the RFID tag. In the case of the mobile device 106, the sender may want to verify that they have encoded the correct shipping information on the RFID tag. For the reader device 124, the shipping entity may scan the RFID tag to obtain a delivery address. FIG. 2E illustrates one example of this Shipping Verification UI 218. As shown, the Shipping Verification UI 218 can present the postage paid to ship the package, a delivery address, and a return address. In the case where the RFID tag is used as a "postage stamp," the shipping verification UI 218 can simply show the postage paid.

In some embodiments, a user that is not the one encoding the RFID tag may only access information deemed "public" from the RFID tag. For instance, a second user scanning the RFID tag of someone else's package may only be able to access a delivery address and not other information such as purchase order details or package content details. In the case where the data is partially or wholly encrypted, only an identifier of the RFID tag may be readable and not a shipping tracking number, for example. In some cases, the individual programming the RFID tag can indicate what information is deemed public.

As a further extension of the example user interfaces, the user interface may be presented that displays options for the user programming the RFID (e.g., a sender) to text or email a recipient the details associated with the RFID tag. For example, the details can include the RFID's unique serial number. Given the unique serial number, the recipient can track progress of the package (used in additional to or instead of a tracking number that a shipping entity/carrier provides). The details can also include an indication that a signature is required or that a recipient be present to accept the package. Given this indication, the recipient can designate an alternative individual to sign or receive the package on their behalf via, for example, a link provided in the text or email.

Figure 3:
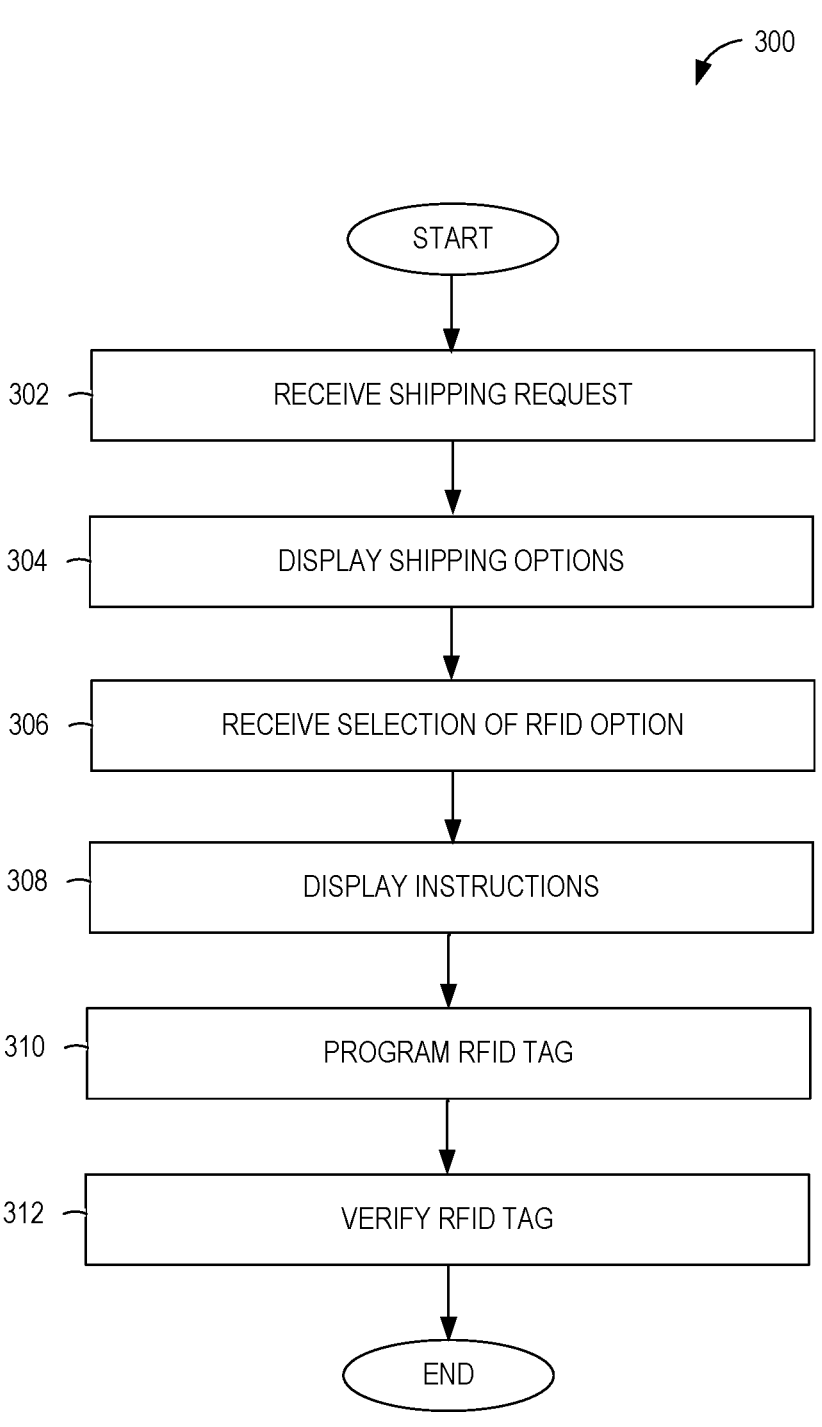
FIG. 3 is a flowchart illustrating operations of a method for generating a RFID shipping label, according to example embodiments.

FIG. 3 is a flowchart illustrating operations of a method 300 for generating a RFID shipping label, according to example embodiments. Operations in the method 300 may be performed by the mobile device 106 and/or the shipping system 118, using components described above with respect to FIG. 1. Accordingly, the method 300 is described by way of example with reference to the mobile device 106 and the shipping system 118. However, it shall be appreciated that at least some of the operations of the method 300 may be deployed on various other hardware configurations or be performed by similar components residing elsewhere in the network environment 100. Therefore, the method 300 is not intended to be limited to the mobile device 106 and the shipping system 118.

In operation 302, a shipping label request is received from a shipper of a package. The shipping label request can initially be received by the mobile application 108 on the mobile device 106. The shipping request can, in some embodiments, then be transmitted to the shipping system 118. In a transaction embodiment, the shipper can be a seller or a buyer. In some cases, the shipping label request is received via a selection of an option to create a shipping label (e.g., Create Shipping Label option 202) presented via the mobile application 108.

In operation 304, shipping options are displayed on the mobile device 106. In some embodiments, the shipping options are displayed on a user interface (e.g., Shipping Label UI 204) generated by the shipping system 118 and provided to the mobile application 108 on the mobile device. In other embodiments, the mobile application 108 generates the user interface based on information retrieved from the network system 102 (e.g., shipping system 118). The shipping options include an option to use an RFID tag.

In operation 306, the mobile device 106 receives a selection of the RFID tag option. The receipt of this selection causes the mobile application 108 to trigger an NFC tag writer component on the mobile device 106 to activate and start transmitting shipping information.

In operation 308, instructions for programming the RFID tag are displayed on the mobile device 106. The shipping system 118 or the mobile application 108 generates and displays the instructions which may indicate to position the mobile device 108 near the RFID tag. Additionally, a corresponding graphic can be displayed. An example of a user interface presenting instructions is shown in FIG. 2C.

In operation 310, the mobile device 106 programs the RFID tag. Specifically, the NFC tag writer component transmits a signal with the shipping information to the RFID tag. The NFC tag writer component can also detect a signal from the RFID tag indicating that the shipping information is encoded on the RFID tag. The RFID tag can now be attached to the package to be shipped, if not already attached prior to the encoding of the RFID tag.

In operation 312, verification of the information written to the RFID can be performed. For example, the sender may want to verify that they have encoded the correct shipping information on the RFID tag. As such, the sender can use their mobile device 106 to read the RFID tag and display the shipping information. Because the mobile device 106 of the sender programmed the RFID, the mobile device 106 can read all the information on the RFID tag. In contrast, a second user may only be able to access public information and a shipping entity can only access shipping information that is encoded or encrypted for their use.

Figure 4:
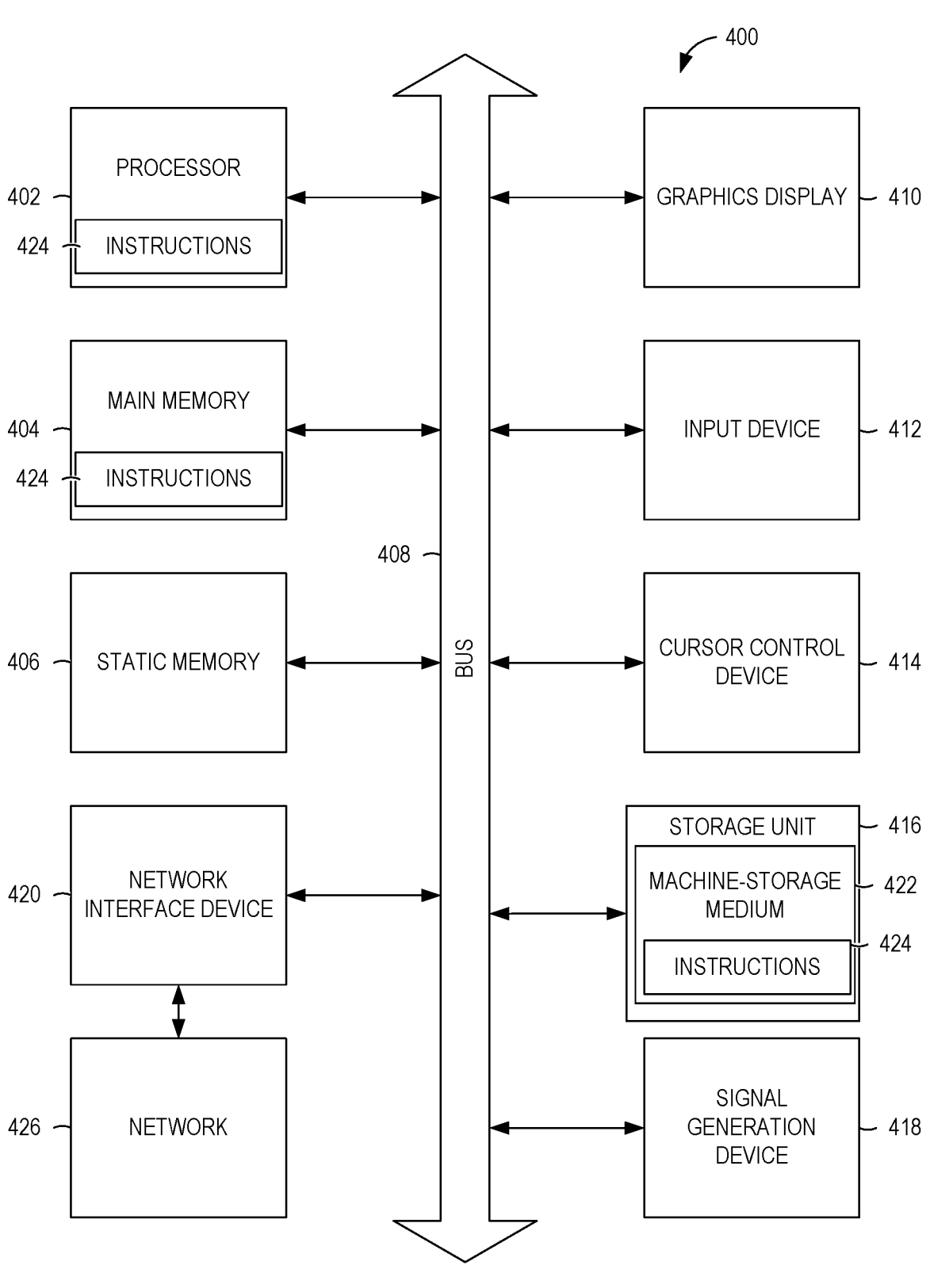
FIG. 4 is a block diagram illustrating components of a machine, according to some examples, able to read instructions from a machine-storage medium and perform any one or more of the methodologies discussed herein.

FIG. 4 illustrates components of a machine 400, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 4 shows a diagrammatic representation of the machine 400 in the example form of a computer device (e.g., a computer) and within which instructions 424 (e.g., software, a program, an application, an applet, an app, or other executable code) for causing the machine 400 to perform any one or more of the methodologies discussed herein may be executed, in whole or in part.

For example, the instructions 424 may cause the machine 400 to execute the flow diagram of FIG. 3. In one embodiment, the instructions 424 can transform the machine 400 into a particular machine (e.g., specially configured machine) programmed to carry out the described and illustrated functions in the manner described.

In alternative embodiments, the machine 400 operates as a standalone device or may be connected (e.g., networked) to other machines. In a networked deployment, the machine 400 may operate in the capacity of a server machine or a client machine in a server-client network environment, or as a peer machine in a peer-to-peer (or distributed) network environment. The machine 400 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 424 (sequentially or otherwise) that specify actions to be taken by that machine. Further, while only a single machine is illustrated, the term "machine" shall also be taken to include a collection of machines that individually or jointly execute the instructions 424 to perform any one or more of the methodologies discussed herein.

The machine 400 includes a processor 402 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 404, and a static memory 406, which are configured to communicate with each other via a bus 408. The processor 402 may contain microcircuits that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more components described herein.

The machine 400 may further include a graphics display 410 (e.g., a plasma display panel (PDP), a light emitting diode (LED) display, a liquid crystal display (LCD), a projector, or a cathode ray tube (CRT), or any other display capable of displaying graphics or video). The machine 400 may also include an input device 412 (e.g., a keyboard), a cursor control device 414 (e.g., a mouse, a touchpad, a trackball, a joystick, a motion sensor, or other pointing instrument), a storage unit 416, a signal generation device 418 (e.g., a sound card, an amplifier, a speaker, a headphone jack, or any suitable combination thereof), and a network interface device 420.

The storage unit 416 includes a machine-storage medium 422 (e.g., a tangible machine-storage medium) on which is stored the instructions 424 (e.g., software) embodying any one or more of the methodologies or functions described herein. The instructions 424 may also reside, completely or at least partially, within the main memory 404, within the processor 402 (e.g., within the processor's cache memory), or both, before or during execution thereof by the machine 400. Accordingly, the main memory 404 and the processor 402 may be considered as machine-storage media (e.g., tangible and non-transitory machine-storage media). The instructions 424 may be transmitted or received over a network 426 via the network interface device 420.

In some example embodiments, the machine 400 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the components described herein.

Executable Instructions and Machine-Storage Medium

The various memories (e.g., 404, 406, and/or memory of the processor(s) 402) and/or storage unit 416 may store one or more sets of instructions and data structures (e.g., software) 424 embodying or utilized by any one or more of the methodologies or functions described herein. These instructions, when executed by processor(s) 402 cause various operations to implement the disclosed embodiments.

As used herein, the terms "machine-storage medium," "device-storage medium," "computer-storage medium" (referred to collectively as "machine-storage medium 422") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 422 include non-volatile memory, including by way of example semiconductor memory devices, for example, erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 422 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 424 may further be transmitted or received over a communications network 426 using a transmission medium via the network interface device 420 and utilizing any one of a number of well-known transfer protocols (e.g., TCP/IP). Examples of communication networks 426 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 424 for execution by the machine 400, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a field programmable gate array (FPGA) or an ASIC. A hardware component may also include programmable logic or circuitry that is temporarily configured by software to perform certain operations. For example, a hardware component may include software encompassed within a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations.

Accordingly, the term "hardware component" should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where the hardware component comprises a general-purpose processor configured by software to become a special-purpose processor, the general-purpose processor may be configured as respectively different special-purpose processors (e.g., comprising different hardware components) at different times. Software may accordingly configure a processor, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, a processor being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented components may be located in a single geographic location (e.g., within a home environment, an office environment, or a server farm). In other example embodiments, the one or more processors or processor-implemented components may be distributed across a number of geographic locations.

EXAMPLES

Example 1 is a method for generating and using RFID shipping labels. The method comprises receiving, via a mobile application operating on a mobile device of a user, a request to access shipping options, the shipping options including an option to program a radio frequency identification (RFID) tag associated with a package to be shipped; in response to receiving the request, causing presentation of the shipping options on a user interface displayed on the mobile device; receiving, via the mobile application, an indication of a selection of the option to program the RFID tag; in response to receiving the indication, causing presentation on a second user interface of instructions to position the mobile device within proximity of the RFID tag; and causing the mobile device to program the RFID tag with shipping information.

In example 2, the subject matter of example 1 can optionally include providing, by the mobile application, an option to read the RFID tag; and in response to receiving a selection of the option to read the RFID tag, causing the mobile device to read the RFID tag and display the shipping information on a third user interface.

In example 3, the subject matter of any of examples 1-2 can optionally include wherein causing the mobile device to program the RFID tag comprises programming the RFID tag with the shipping information in a format that is readable by a plurality of different shipping entities, the shipping information comprising multiple sets of shipping information, each set being readable by a different shipping entity.

In example 4, the subject matter of any of examples 1-3 can optionally include wherein causing the mobile device to program the RFID tag comprises programming the RFID tag with the shipping information in a format that is only readable by a shipping entity selected by a user of the mobile application.

In example 5, the subject matter of any of examples 1-4 can optionally include wherein programming the RFID tag with the shipping information in the format only readable by the shipping entity selected by the user comprises encrypting the shipping information, the encrypted shipping information only decryptable by the selected shipping entity.

In example 6, the subject matter of any of examples 1-5 can optionally include in response to a reader device of a shipping entity reading the RFID tag, causing the reader device to display retrieved shipping information on a user interface of the reader device, the retrieved shipping information comprising shipping information encoded to be readable by the shipping entity.

In example 7, the subject matter of any of examples 1-6 can optionally include causing display of an option to text or email details of the RFID tag to a recipient of the package; and texting or emailing the details of the RFID tag to the recipient of the package based on a selection of the option.

In example 8, the subject matter of any of examples 1-7 can optionally include causing a lidar sensor on the mobile device to scan the package and estimate dimensions of the package.

In example 9, the subject matter of any of examples 1-8 can optionally include wherein the RFID tag comprises a sticker that is attached to the package or inserted into the package to be delivered based on the shipping information.

Example 10 is a system for generating and using RFID shipping labels. The system comprises one or more processors and a memory storing instructions that, when executed by the one or more processors, cause the one or more processors to perform operations comprising receiving, via a mobile application operating on a mobile device of a user, a request to access shipping options, the shipping options including an option to program a radio frequency identification (RFID) tag associated with a package to be shipped; in response to receiving the request, causing presentation of the shipping options on a user interface displayed on the mobile device; receiving, via the mobile application, an indication of a selection of the option to program the RFID tag; in response to receiving the indication, causing presentation on a second user interface of instructions to position the mobile device within proximity of the RFID tag; and causing the mobile device to program the RFID tag with shipping information.

In example 11, the subject matter of example 10 can optionally include wherein the operations further comprise providing, by the mobile application, an option to read the RFID tag; and in response to receiving a selection of the option to read the RFID tag, causing the mobile device to read the RFID tag and display the shipping information on a third user interface.

In example 12, the subject matter of any of examples 10-11 can optionally include wherein causing the mobile device to program the RFID tag comprises programming the RFID tag with the shipping information in a format that is readable by a plurality of different shipping entities, the shipping information comprising multiple sets of shipping information, each set being readable by a different shipping entity.

In example 13, the subject matter of any of examples 10-12 can optionally include wherein causing the mobile device to program the RFID tag comprises programming the RFID tag with the shipping information in a format that is only readable by a shipping entity selected by a user of the mobile application.

In example 14, the subject matter of any of examples 10-13 can optionally include wherein programming the RFID tag with the shipping information in the format only readable by the shipping entity selected by the user comprises encrypting the shipping information, the encrypted shipping information only decryptable by the selected shipping entity.

In example 15, the subject matter of any of examples 10-14 can optionally include wherein the operations further comprise in response to a reader device of a shipping entity reading the RFID tag, causing the reader device to display retrieved shipping information on a user interface of the reader device, the retrieved shipping information comprising shipping information encoded to be readable by the shipping entity.

In example 16, the subject matter of any of examples 10-15 can optionally include receiving, via a device of a recipient, an indication of an alternative individual designated to receive the package on behalf of the recipient.

In example 17, the subject matter of any of examples 10-16 can optionally include wherein the operations further comprise causing a lidar sensor on the mobile device to scan the package and estimate dimensions of the package.

In example 18, the subject matter of any of examples 10-17 can optionally include wherein the RFID tag comprises a sticker that is attached to the package or inserted into the package to be delivered based on the shipping information.

Example 19 is a computer-storage medium comprising instructions which, when executed by one or more processors of a machine, cause the machine to perform operations for generating and using RFID shipping labels. The operations comprise receiving, via a mobile application operating on a mobile device of a user, a request to access shipping options, the shipping options including an option to program a radio frequency identification (RFID) tag associated with a package to be shipped; in response to receiving the request, causing presentation of the shipping options on a user interface displayed on the mobile device; receiving, via the mobile application, an indication of a selection of the option to program the RFID tag; in response to receiving the indication, causing presentation on a second user interface of instructions to position the mobile device within proximity of the RFID tag; and causing the mobile device to program the RFID tag with shipping information.

In example 20, the subject matter of example 19 can optionally include wherein causing the mobile device to program the RFID tag comprises programming the RFID tag with the shipping information in a format that is readable by a plurality of different shipping entities, the shipping information comprising multiple sets of shipping information, each set being readable by a different shipping entity.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method comprising:

receiving, via a mobile application operating on a mobile device of a user that is shipping a package, a request to access shipping options for the package, the shipping options including at least an option to print a shipping label and an option to program a radio frequency identification (RFID) tag with shipping information;

in response to receiving the request, causing presentation, on the mobile device, of a user interface that displays at least a shipping address and the shipping options;

receiving, via the mobile application, an indication of a selection of the option to program the RFID tag with the shipping information;

in response to receiving the indication, causing presentation on a second user interface of instructions to position the mobile device within proximity of the RFID tag;

causing the mobile device to program the RFID tag with a plurality of different sets of the shipping information corresponding to a plurality of shipping entities, each set being encrypted such that each set is decryptable and readable only by a corresponding shipping entity of the plurality of shipping entities;

after programming the RFID tag, causing display, on the mobile device of the user, of an option to transmit details of the RFID tag to a recipient of the package; and in response to selection of the option, transmitting the details of the RFID tag to the recipient of the package.

2. The method of claim 1, further comprising:

after programming the RFID tag, providing, by the mobile application, an option to verify the shipping information was encoded correctly; and in response to receiving a selection of the option to verify the shipping information, causing the mobile device to read the RFID tag and display, on a shipping verification user interface, at least postage paid to ship the package.

3. The method of claim 1, further comprising:

in response to a reader device of a shipping entity reading the RFID tag, causing the reader device to display retrieved shipping information on a user interface of the reader device, the retrieved shipping information comprising shipping information encoded to be readable by the shipping entity.

4. The method of claim 1, wherein the transmitting comprises texting or emailing the details of the RFID tag to the recipient of the package, the details including a unique serial number of the RFID tag that can be used for tracking purposes.

5. The method of claim 1, further comprising:

causing a lidar sensor on the mobile device to scan the package and estimate dimensions of the package.

6. The method of claim 1, wherein the RFID tag comprises a sticker that is attached to the package or inserted into the package to be delivered based on the shipping information.

7. A system comprising:

one or more processors; and a memory storing instructions that, when executed by the one or more processors, cause the one or more processors to perform operations comprising:

receiving, via a mobile application operating on a mobile device of a user that is shipping a package, a request to access shipping options for the package, the shipping options including at least an option to print a shipping label and an option to program a radio frequency identification (RFID) tag with shipping information;

in response to receiving the request, causing presentation, on the mobile device, of a user interface that displays at least a shipping address and the shipping options;

receiving, via the mobile application, an indication of a selection of the option to program the RFID tag with the shipping information;

in response to receiving the indication, causing presentation on a second user interface of instructions to position the mobile device within proximity of the RFID tag;

causing the mobile device to program the RFID tag with a plurality of different sets of the shipping information corresponding to a plurality of shipping entities, each set being encrypted such that each set is decryptable and readable only by a corresponding shipping entity of the plurality of shipping entities;

after programming the RFID tag, causing display, on the mobile device of the user, of an option to transmit details of the RFID tag to a recipient of the package; and in response to selection of the option, transmitting the details of the RFID tag to the recipient of the package.

8. The system of claim 7, wherein the operations further comprise:

after programming the RFID tag, providing, by the mobile application, an option to verify the shipping information was encoded correctly; and in response to receiving a selection of the option to verify the shipping information, causing the mobile device to read the RFID tag and display, on a shipping verification user interface, at least postage paid to ship the package.

9. The system of claim 7, wherein the operations further comprise:

in response to a reader device of a shipping entity reading the RFID tag, causing the reader device to display retrieved shipping information on a user interface of the reader device, the retrieved shipping information including an indication that a signature is required and causing display of a field for the signature.

10. The system of claim 7, wherein the operations further comprise:

receiving, via a device of a recipient, an indication of an alternative individual designated to receive the package on behalf of the recipient.

11. The system of claim 7, wherein the operations further comprise:

causing a lidar sensor on the mobile device to scan the package and estimate dimensions of the package.

12. The system of claim 7, wherein the RFID tag comprises a sticker that is attached to the package or inserted into the package to be delivered based on the shipping information.

13. A machine-storage medium comprising instructions which, when executed by one or more processors of a machine, cause the machine to perform operations comprising:

receiving, via a mobile application operating on a mobile device of a user that is shipping a package, a request to access shipping options for the package, the shipping options including at least an option to print a shipping label and an option to program a radio frequency identification (RFID) tag with shipping information;

in response to receiving the request, causing presentation, on the mobile device, of the shipping options on a user interface that displays at least a shipping address and the shipping options;

receiving, via the mobile application, an indication of a selection of the option to program the RFID tag with the shipping information;

in response to receiving the indication, causing presentation on a second user interface of instructions to position the mobile device within proximity of the RFID tag;

causing the mobile device to program the RFID tag with a plurality of different sets of shipping information corresponding to a plurality of shipping entities, each set being encrypted such that each set is decryptable and readable only by a corresponding shipping entity of the plurality of shipping entities;

after programming the RFID tag, causing display, on the mobile device of the user, of an option to transmit details of the RFID tag to a recipient of the package; and in response to selection of the option, transmitting the details of the RFID tag to the recipient of the package.

14. The method of claim 1, wherein a portion of the shipping information is deemed public and is accessible to any individual and a portion of the shipping information is only accessible by a shipping entity indicated by the user of the mobile device.

15. The method of claim 1, further comprising:

providing a download of the mobile application to the mobile device.

16. The method of claim 1, further comprising:

causing presentation of a user interface on a device of the recipient that provides a selectable option to designate another individual to sign for the package and a field to indicate the individual.

\* \* \* \* \*